United States Patent [19]

Jeffries et al.

[11] Patent Number: 5,682,291
[45] Date of Patent: Oct. 28, 1997

[54] CARRIER FOR A COMPUTER DEVICE

[75] Inventors: John Jeffries, Marble Falls; Doug Dewey, Pflugerville, both of Tex.

[73] Assignee: Dell U.S.A., L.P., Austin, Tex.

[21] Appl. No.: 676,700

[22] Filed: Jul. 10, 1996

[51] Int. Cl.$^6$ .................... G06F 1/16; H05K 7/12
[52] U.S. Cl. ............ 361/1.85; 361/683; 361/725; 361/727; 312/223.2
[58] Field of Search .................. 361/683–686, 361/724–727; 364/708.1; 312/223.1, 223.2, 223.3; G06F 1/16

[56] References Cited

U.S. PATENT DOCUMENTS

| | | | |
|---|---|---|---|
| D. 358,141 | 5/1995 | Pecone et al. | |
| 5,155,662 | 10/1992 | I-Shou | |
| 5,233,594 | 8/1993 | Wilhelm | |
| 5,349,483 | 9/1994 | Tsai | |
| 5,355,267 | 10/1994 | Aoyagi et al. | |
| 5,488,538 | 1/1996 | Wakita | |
| 5,510,955 | 4/1996 | Taesang | 361/685 |
| 5,548,480 | 8/1996 | Rudi et al. | 361/685 |
| 5,595,501 | 1/1997 | Ho | 439/377 |

FOREIGN PATENT DOCUMENTS

| | | |
|---|---|---|
| 0 337 399 A2 | 10/1989 | European Pat. Off. |
| 0 632 455 A1 | 1/1995 | European Pat. Off. |
| 0 680 047 A2 | 11/1995 | European Pat. Off. |

*Primary Examiner*—Leo P. Picard
*Assistant Examiner*—Lynn D. Feild
*Attorney, Agent, or Firm*—Haynes and Boone, L.L.P.

[57] ABSTRACT

Method and apparatus for quickly and easily securing a computer device, such as a floppy disk drive, to a device carrier. In a preferred embodiment, the carrier contains a plurality of dowels that align with pre-existing screw holes on the device. When the device is placed into the carrier, a first dowel attached to a bottom panel of the carrier is inserted into a first screw hole of the device. The device is thereby partially secured to the carrier. The device is further secured to the carrier when both the device and the carrier together are inserted into a computer bay. As the carrier enters the computer bay, a second dowel flexibly attached to a side panel of the carrier is inserted into a second screw hole of the device. Therefore, whenever the device and carrier are in the computer bay, the device is completely secured to the carrier.

21 Claims, 3 Drawing Sheets

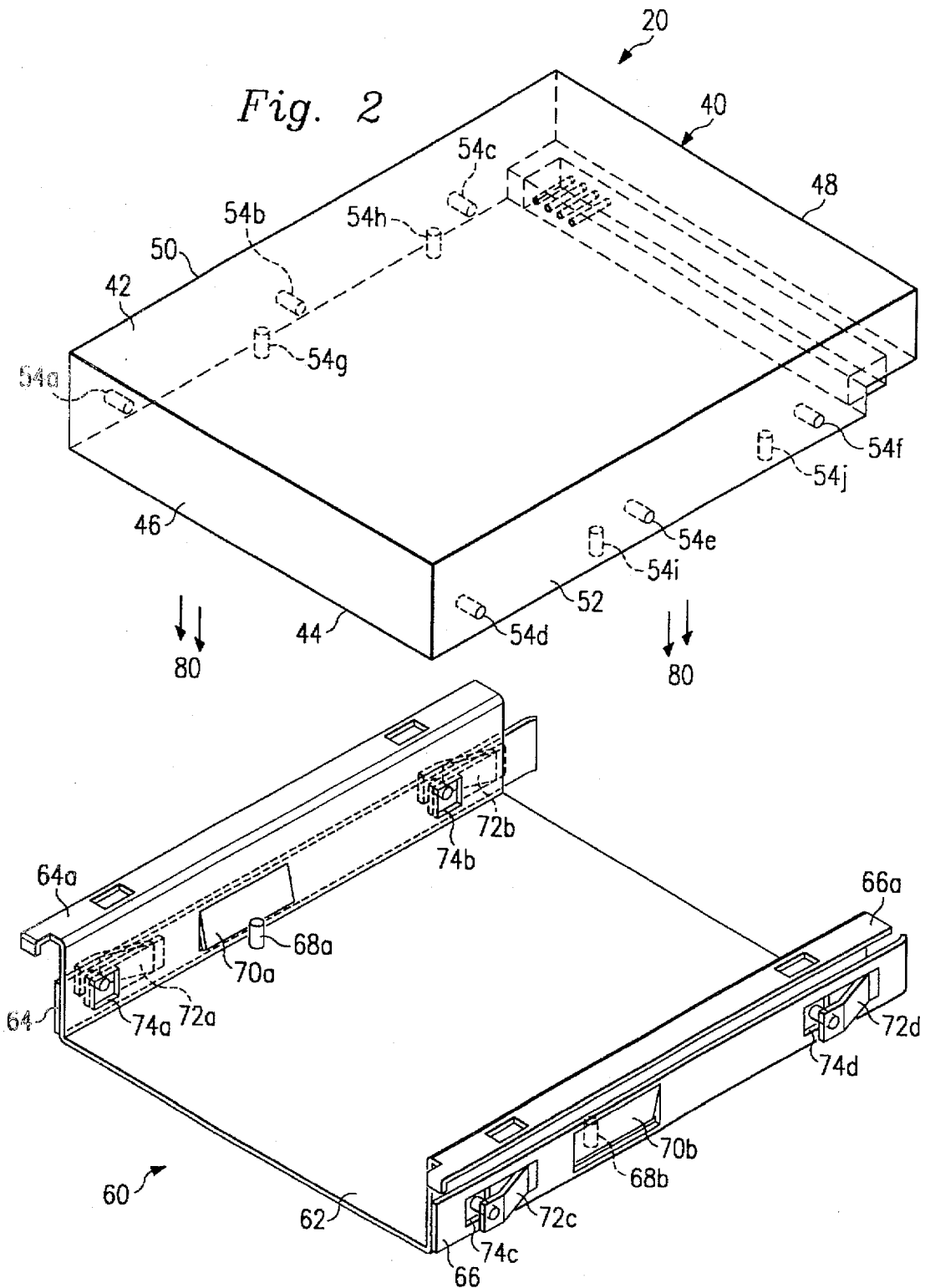

CARRIER FOR A COMPUTER DEVICE

TECHNICAL FIELD

The invention relates generally to personal computer designs and more specifically, to a carrier that securely mounts a peripheral device in a computer.

BACKGROUND OF THE INVENTION

Computer systems utilize a number of peripheral devices and/or internally mounted devices for various functions required by the system and its users. For example, a floppy disk drive device is an internally mounted device used in many computers. These devices are generally placed in bays within a computer chassis. A bay simply represents an area associated with the computer chassis for receiving and storing such devices. In most computer systems it is essential that these devices are not only located inside the bay, but securely mounted to the computer to prevent vibrations, disconnections, and other problems therein related.

In order to insert a device into its respective bay, a carrier is frequently used as a platform to hold the device. In so doing, the device is first secured to the carrier and then the carrier is secured to the computer chassis. Conventionally, the device is secured to the carrier using a plurality of screws. The device contains threaded screw holes which align with holes on the carrier. When the device is placed inside the carrier, one or more screws are inserted through the carrier and into the device, thereby securing the device to the carrier. Once engaged, the carrier and device are inserted into their respective bay and secured thereto.

Although the screws secure the device to the carrier, they pose many problems. First of all, screws are extra parts that must be maintained. For example, a computer manufacturer must provide a plurality of screws for each device and carrier that it assembles. In addition, screwing the device to the carrier takes a long time. In a typical setting, it takes about 55 seconds for a person to screw the device to the carrier. Furthermore, screws can damage the device, carrier, or computer. For example, screw holes can become misaligned or cross-threaded; screws can cause burrs which may damage the computer; screws can be accidentally dropped inside the computer and screws can back out of the carrier, thereby unsecuring the device inside the carrier.

As a consequence, there exists a need for a carrier which adequately secures a device but does so quickly, easily and without using screws.

SUMMARY OF THE INVENTION

The foregoing problems are solved and a technical advance is achieved by a method and apparatus for quickly and easily securing a computer device, such as a floppy disk drive, to a device carrier. In a preferred embodiment, the carrier contains a bottom panel and two side panels for receiving the device. Each of the panels also contains a dowel that aligns with screw holes located on the device. The dowels attached to the side panels are initially flexed away from the device. The device is first placed inside the carrier so that the dowel attached to the bottom panel of the carrier is inserted into the corresponding device screw hole. The device and the carrier are then inserted into a computer bay. When the carrier is inserted into the bay, the sides of the bay force the side panel dowels into their corresponding device screw holes. As a result, whenever the device and carrier are in the computer bay, the device is completely secured to the carrier.

A technical advantage achieved with the invention is that no screws are required to secure the device to the carrier.

A second technical advantage achieved with the invention is that no tools are needed for joining or separating the device and carrier.

A third technical advantage achieved with the invention is that an average assembly time required to engage the device into the carrier is reduced from about 55 seconds to less than 20 seconds per device.

BRIEF DESCRIPTION OF THE DRAWINGS

FIG. 2 is a perspective view of a floppy disk drive and the carrier of FIG. 1.

DESCRIPTION OF THE PREFERRED EMBODIMENT

Figure 1:
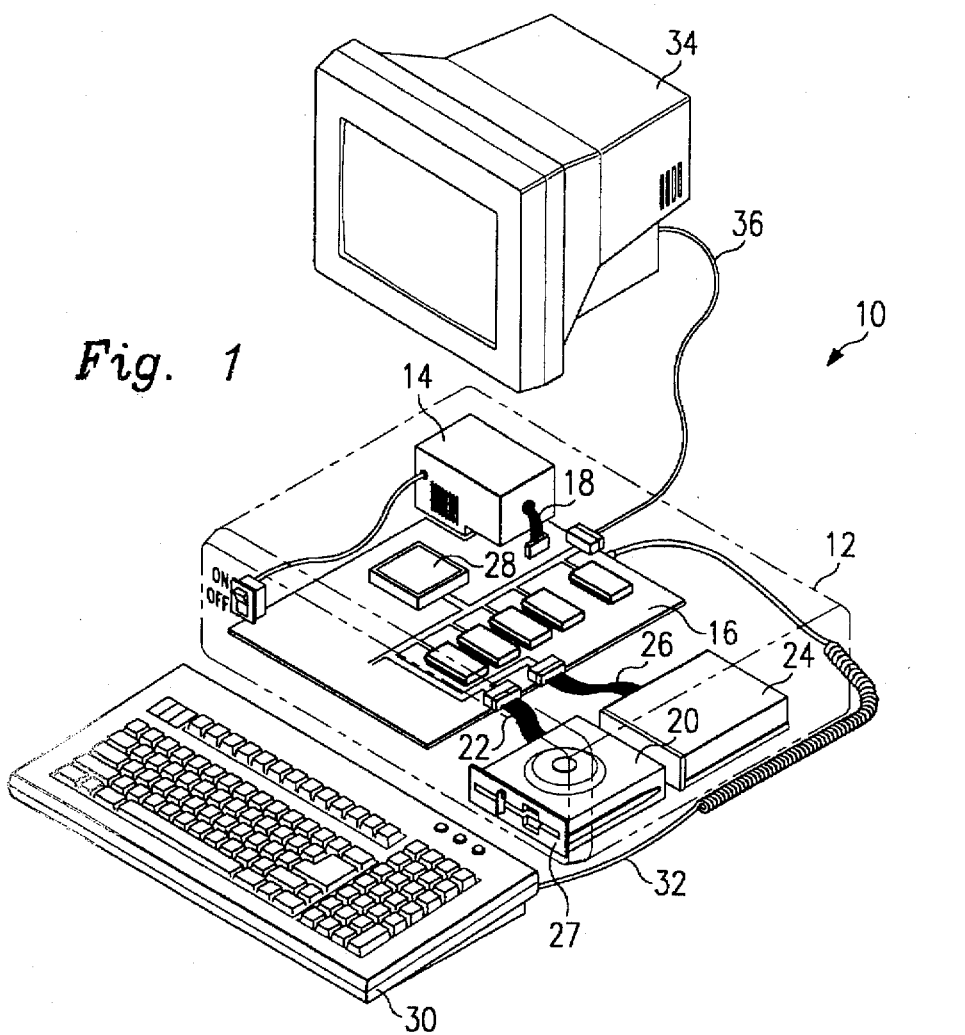
FIG. 1 is a perspective view of a computer system having a carrier embodying features of the present invention.

Referring to FIG. 1, the reference numeral 10 refers to a desktop computer system, though it may also refer to a laptop computer, a file server, a mainframe computer, or the like. The computer system 10 includes a chassis 12 (shown in phantom) which houses a power supply 14, a motherboard 16 electrically connected via a positive power supply line 18 to the power supply, a floppy disk drive 20 operatively connected to the motherboard via a ribbon cable 22, and a hard disk drive device 24 operatively connected to the motherboard via a ribbon cable 26. Both the floppy drive 20 and the hard disk drive 24 are located in bays inside the chassis 12. The bay associated with the floppy drive 20 is designated by the reference numeral 27.

The motherboard 16 includes a central processing unit (CPU) 28 connected for receiving electrical power from the power supply 14 via the power supply line 18 and a positive power supply plane (not shown) embedded within the motherboard. The computer system 10 also includes a keyboard 30 operatively connected to the motherboard 16 and CPU 28 via a cable 32 for inputting data and instructions to the CPU 28, and a video monitor 34 operatively connected to the motherboard 16 and CPU 28 via a cable 36 for displaying output generated by the CPU. Individually, the foregoing components of the computer system 10 are well known in the art and will, therefore, not be described in further detail.

For the sake of clarity and simplicity, only the floppy drive 20 and a carrier associated therewith will be discussed in detail below. However, it is understood that the present invention works equally well with the hard disk drive 24 or any other device similarly situated.

Referring to FIG. 2, in general, devices such as floppy drives come in many different shapes and sizes. The floppy drive 20 described herein is a conventional device, it being understood that the present invention is not limited to any particular shape or size of device. The floppy drive 20 contains a housing 40 comprising a top side 42, a bottom side 44, a front side 46, a back side 48, a left side 50 and a right side 52. Although not shown, the front side 46 contains an opening to receive a floppy disk and the back side 48 contains an electrical connector for the ribbon cable 22 (FIG. 1).

Devices such as the floppy drive 20 contain a plurality of screw holes for securing it inside of a computer chassis. The floppy drive 20 describe herein contains ten threaded holes 54a–j for receiving screws, such that three holes 54a, 54b, 54c are located in the left side 50, three holes 54d, 54e, 54f are located in the right side 52, and four holes 54g, 54h, 54i, 54j are located in the bottom side 44.

The reference numeral 60 designates a preferred embodiment of a device carrier implementing features of the present invention. The carrier 60 contains a bottom panel 62, a left panel 64 and a right panel 66. A distance between the left and right panels 64, 66 is greater than a distance between the left and right sides 50, 52 of the floppy drive 20 so that the carrier 60 can receive the floppy drive, as described in greater detail below. The left and right panels 64, 66 also include two support rails 64a, 66a, respectively for supporting the carrier 60 inside the computer chassis 12 (FIG. 1), as will be discussed in greater detail below.

The carrier 60 contains a plurality of dowels that are permanently attached to the bottom, left and right panels and that correspond with some of the screw holes of the device 20, as described in greater detail below. The dowels are constructed of metal and have a diameter that is slightly less than an inside diameter of their corresponding screw holes. In the preferred embodiment, the dowels are smooth, cylinder-shaped pins, but in an alternative embodiment the dowels may include ridges that engage with the threaded screw holes of the device 20.

The bottom panel 62 contains two dowels 68a, 68b, each protruding upwardly, towards the center of the carrier 60. The left and right panels 64, 66 contain a flexible tab 70a, 70b, respectively, such that in a normal, relaxed position, the tabs are flexed inwardly and toward the center of the carrier 60. Although the tabs 70a, 70b can be located anywhere on the side panels 64, 66, in the preferred embodiment, they are positioned near the dowels 68a, 68b, respectively. The left panel 64 also contains two dowel tabs 72a, 72b and two holes 74a, 74b associated therewith. The right panel 66 also contains two dowel tabs 72c, 72d and two holes 74c, 74d associated therewith.

Figure 3:
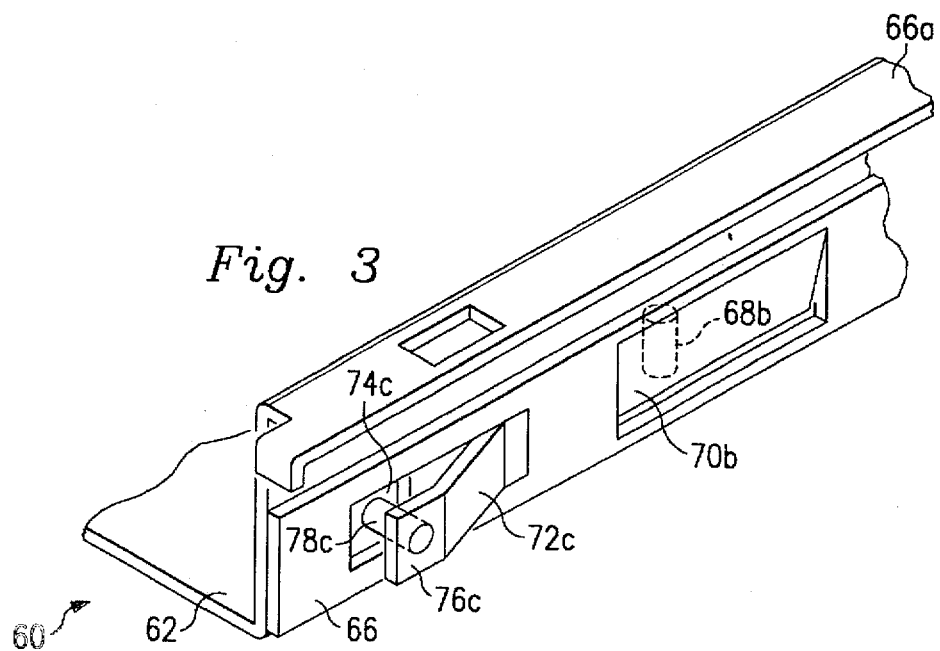
FIG. 3 is a closeup view of a dowel tab of the carrier of FIG. 1.

Referring to FIG. 3, the dowel tab 72c is representative of each of the dowel tabs 72a–72d. The dowel tab 72c comprises a tab 76c and a dowel 78c. The dowel 78c is attached to the tab 76c so that the dowel extends inwardly and toward the center of the carrier 60. The tab 76c is flexible, and in a normal, relaxed position, is flexed outwardly and away from the center of the carrier 60. Furthermore, in the normal, relaxed position, the tab 76c extends a sufficient distance from the side panel 66 so that the dowel 78c does not extend all the way through the opening 74c of the side panel.

Referring again to FIG. 2, the floppy drive 20 is initially secured to the carrier 60 by applying a force, represented by reference arrows 80, on the floppy drive to position it inside the carrier. As the bottom side 44 of the floppy drive approaches the bottom panel 62 of the carrier, the dowel 68a protrudes into the screw hole 54g and the dowel 68b protrudes into the screw hole 54i. Furthermore, the force 80 must be increased because the flexible tabs 70a, 70b press against the left and right sides 50, 52, respectively. As a result, the dowels 68a–b prevent the floppy drive 20 from moving horizontally inside the carrier 60, wherein horizontal movement describes movement parallel with the bottom panel 62. The dowels 68a–b also perfectly align the screw holes 54a, 54c, 54d, 54f of the floppy drive inside the carrier for purposes discussed in greater detail below. Furthermore, the flexible tabs 70a, 70b frictionally engage with the left and right sides 50, 52, respectively, thereby preventing, to a limited degree, vertical separation between the floppy drive 20 and the carrier 60, wherein vertical separation describes movement perpendicular with the bottom panel 62. However, the floppy drive 20 and the carrier 60 can be easily separated by applying a force in the opposite direction of the reference arrows 80.

Figure 4:
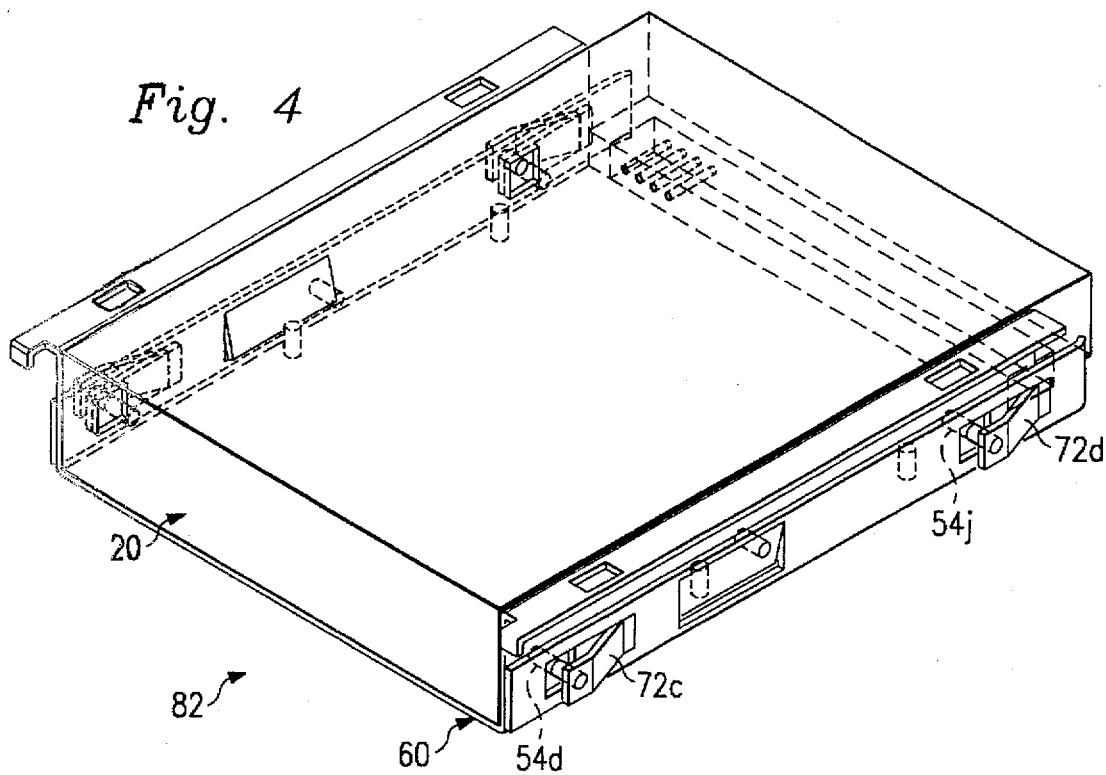
FIG. 4 is a perspective view of the combined floppy disk drive and carrier of FIG. 2.

Referring to FIG. 4, once the bottom side 44 of the floppy drive contacts the bottom panel 62 of the carrier, the floppy drive is initially secured to the carrier. Although the dowel tabs 72a–72d are still in the normal, relaxed position, the dowels associated with each of the dowel tabs now align with the screw holes 52a, 54c, 54d, 54f, respectively. The reference numeral 82 collectively designates a carrier-device system that includes both the floppy drive 20 and the carrier 60.

Figure 5:
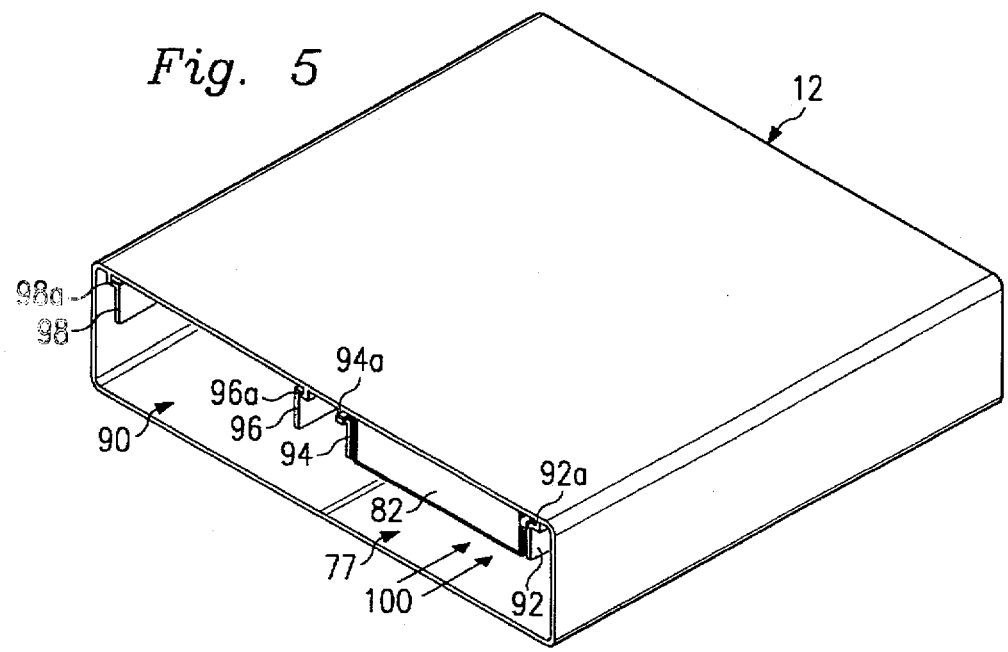
FIG. 5 is a perspective view of the combined floppy disk drive and carrier of FIG. 4 inserted into a chassis of the computer system of FIG. 1.

Referring to FIG. 5, the chassis 12 of the computer system 10 (FIG. 1) is illustrated with the bay 27 and a second bay 90. Each of the bays 27, 90 include left and right support members 92, 94 and 96, 98, respectively. A distance between the support members 92 and 94 is slightly greater than the distance between the side panels 64 and 66 of the carrier 60. Furthermore, each of the support members 92, 94, 96, 98 includes a recessed area 92a, 94a, 96a, 98a, respectively, for receiving support rails such as support rails 64a and 66a of the carrier 60.

FIG. 5 illustrates the carrier-device system 82 (FIG. 4) securely attached inside the bay 27 of the chassis 12. This is achieved by the following steps. First of all, the support rails 64a, 66a of the carrier-device system 82 are aligned with the recessed areas 94a, 92a, respectively. Next, a force is applied, represented by reference arrows 100, to insert the carrier-device system 82 inside the bay 27. As the carrier-device system 82 moves inside the day 27, the dowel tabs 72a–d are forced inward and toward the center of the carrier-device system, by the support members 92 and 94. The dowels associated with each dowel tab 72a–d are thereby inserted inside the screw holes 52a, 54c, 54d, 54f, respectively. As a result, when the carrier-device system 82 is inserted into the chassis 12, the floppy drive 20 is horizontally and vertically secured to the carrier 60 and thereby to the bay 27.

In a similar manner, the carrier-device system 82 can be removed from the bay 27 by applying a force in the opposite direction of the reference arrows 100. When the carrier-device system 82 is removed, the dowel tabs 72a–d return to their normal, relaxed position, thereby removing each of the dowels from the screw holes 52a, 54c, 54d, 54f. As a result, the device 20 can be quickly and easily separated from the carrier 60.

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

What is claimed is:

1. A computer system comprising a chassis, a bay associated with the chassis, and a device secured inside the bay with a carrier, wherein the device contains holes to secure it to the carrier and wherein the carrier comprises:

a left side panel;

a right side panel; and a bottom panel including a first dowel that aligns with a first one of the device holes whenever the device is placed into the carrier;

wherein at least one of the side panels includes a dowel tab that inserts a second dowel into a second one of the device holes whenever the carrier is inserted into the bay.

2. The computer system of claim 1 wherein at least one of the side panels further includes a flex tab for temporarily securing the device into the carrier whenever the device is placed therein.

3. The computer system of claim 1 wherein the dowel tab flexes away from the device whenever the carrier is not inserted into the bay so that the second dowel is not inserted into one of the device holes.

4. The computer system of claim 1 wherein the device holes are screw holes.

5. The computer system of claim 1 wherein the chassis includes support members that support the carrier whenever it is in the bay, and that cause the dowel tab to insert the second dowel into the second device hole whenever the device is being inserted into the bay.

6. The computer system of claim 1 wherein the chassis includes one or more support members that support the carrier whenever it is in the bay, and that cause the dowel tab to withdraw the second dowel from the second device hole whenever the device is removed from the bay.

7. A method for securing a device to a carrier inside a computer bay, the method comprising:

placing the device into the carrier so that the device receives a first dowel attached to a bottom panel of the carrier;

inserting the device and the carrier into the computer bay so that the device receives a second dowel mounted on a movable dowel tab attached to a side panel of the carrier.

8. The method of claim 7 wherein the device receives the first and second dowels through screw holes located in the device.

9. The method of claim 7 further comprising temporarily securing the device in the carrier with a flex tab before the device is inserted into the computer bay.

10. The method of claim 7 wherein the second dowel is removed from the device whenever the carrier is not inserted into the bay.

11. The method of claim 7 wherein the computer bay includes on or more support members that support the carrier whenever it is in the bay, wherein the step of inserting causes the support members to force the dowel tab to engage the second dowel into the device.

12. The method of claim 11 further comprising the step of removing the device and the carrier from the computer bay so that the support members allow the dowel tab to disengage the second dowel from the device.

13. The method of claim 7 wherein the device is a disk drive.

14. A carrier for securing a device to be inserted into a bay, the carrier comprising:

first means connected to the carrier for horizontally securing the device when the device is initially placed therein;

second means mounted on a movable dowel tab connected to the carrier for horizontally and vertically securing the device only when the device is inserted in the bay.

15. The carrier of claim 14 wherein the device contains holes for receiving the first and second means.

16. The carrier of claim 15 wherein the holes are screw holes.

17. The carrier of claim 15 wherein the first and second means include dowels.

18. The carrier of claim 17 wherein the first means further includes a flex tab which temporarily loosely secures the device to the carrier.

19. The carrier of claim 14 wherein the second means no longer secures the device whenever the carrier is removed from the bay.

20. The carrier of claim 14 wherein the computer bay includes support members that support the carrier whenever it is in the bay, and wherein the second means includes a dowel, such that the support members cause the dowel tab to engage the dowel into the device whenever the device is being inserted into the bay and to disengage the dowel from the device whenever the device is being removed from the bay.

21. The carrier of claim 14 wherein the device is a disk drive.

* * * * *